Patented Apr. 27, 1926.

1,582,675

UNITED STATES PATENT OFFICE.

REINHOLD FICK, OF LUDWIGSHAFEN-ON-RHINE, GERMANY, ASSIGNOR TO BADISCHE ANILIN- & SODA-FABRIK, OF LUDWIGSHAFEN-ON-RHINE, GREMANY, A CORPORATION OF GERMANY.

PRODUCTION OF FORMAMID.

No Drawing.   Application filed April 3, 1925.   Serial No. 20,548.

*To all whom it may concern:*

Be it known that I, REINHOLD FICK, a citizen of the German Empire, residing at Ludwigshafen-on-Rhine, Germany, have invented new and useful Improvements in Production of Formamid, of which the following is a specification.

Formamid though a compound possessing various valuable uses, can be prepared from ammonium formate, according to the known methods, only with trouble and considerable loss as the conversion takes place slowly and in an incomplete way and with the formation of undesirable by-products.

According to my invention, ammonium formate is rapidly and completely transformed into formamid by passing it with a current of ammonia and with or without inert gases, over suitable catalysts. The temperature should be moderately high, e. g. between about 100 degrees and 200 degrees centigrade in order to avoid a more far-reaching reaction with a formation of cyanhydric acid taking place in a substantial degree. Catalysts of a dehydrating nature have according to my invention proved suitable as for example bauxite, alumina, titanium oxid, thoria, silica, iron oxid or oxids of other metals or phosphates of aluminium, china clay, pumice stone, kieselguhr and others. Such bodies are preferably heated to a high temperature prior to use and may be employed either alone or mixed with each other or with supports.

As the production of formamid is effected in the presence of ammonia, ammonium formate can be replaced by free formic acid when of course an excess of ammonia must be present, and both ammonium formate and formic acid may be employed in solution or dilution, with water.

The formamid produced can be separated from the reaction gases and from water vapor contained therein by fractional cooling.

In order to more fully describe my invention and the manner of carrying the same into practice the following examples are given which however may be varied without departing from the scope of the invention.

Example 1.

Ammonium formate, whether dry or containing only a little water, is evaporated in a rapid current of ammonia at about 140 degrees centigrade, and the mixture is passed through a layer of calcined bauxite which is kept at about 170 degrees centigrade. The reaction gases are cooled to about 60 degrees centigrade whereby formamid is condensed nearly free from water. The residual gases are freed from water in a second cooler and led back into the evaporator containing ammonium formate.

Example 2.

An aqueous solution of ammonium formate of 60 per cent strength is evaporated in a rapid current of ammonia and the mixture passed through a layer of calcined bauxite kept at about 170 degrees centigrade. The reaction gases are passed through a column the temperature of which is suitably controlled so as to condense only formamid while water vapors are subsequently condensed in a separate cooler. The gaseous ammonia is led back in a cycle, passing, if desired, through a preheater or heat exchanger. Formamid is produced in a nearly theoretical yield and practically free from water. Scarcely any gaseous products of decomposition are produced. The circulating gaseous ammonia may be mixed with other gases, for example air, nitrogen, hydrogen and the like.

When formic acid is employed instead of ammonium formate the process may be carried out in a similar manner.

I claim:—

1. A process for the production of formamid which consists in passing ammonium formate in the vapor phase together with ammonia over a contact mass at a temperature below that at which substantial amounts of cyanhydric acid are formed.

2. A process for the production of formamid which consists in passing ammonium formate in the vapor phase together with ammonia over a contact mass of a dehydrating character at a temperature not surpassing about 200 degrees centigrade.

3. A process for the production of formamid which consists in passing ammonium formate in the vapor phase together with ammonia and water vapor over a contact mass of a dehydrating character at a temperature not surpassing about 200 degrees centigrade.

4. A process for the production of formamid which consists in passing ammonium formate in the vapor phase together with ammonia and an inert gas over a contact mass of a dehydrating character at a temperature not surpassing about 200 degrees centigrade.

5. The process of manufacturing formamid which consists in evaporating formic acid in an excess of gaseous ammonia and passing the mixture over a contact mass of a dehydrating character at a temperature below about 200 degrees centigrade.

6. A process for the production of formamid which consists in passing ammonium formate in the vapor phase together with ammonia over a contact mass of a dehydrating character at a temperature not surpassing about 200 degrees centigrade and subjecting the reaction gases to fractional cooling so as to condense formamid but leaving water vapor substantially uncondensed.

In testimony whereof I have hereunto set my hand.

REINHOLD FICK.